United States Patent
Lu et al.

(10) Patent No.: US 12,010,720 B2
(45) Date of Patent: Jun. 11, 2024

(54) TERMINAL CONNECTION METHOD, FIRST TERMINAL AND SECOND TERMINAL

(71) Applicant: GUANGDONG OPPO MOBILE TELECOMMUNICATIONS CORP., LTD., Guangdong (CN)

(72) Inventors: Qianxi Lu, Dongguan (CN); Jianhua Liu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 354 days.

(21) Appl. No.: 17/486,155

(22) Filed: Sep. 27, 2021

(65) Prior Publication Data

US 2022/0015138 A1   Jan. 13, 2022

Related U.S. Application Data

(63) Continuation of application No. PCT/CN2019/080229, filed on Mar. 28, 2019.

(51) Int. Cl.
*H04W 74/00* (2009.01)
*H04W 24/02* (2009.01)
*H04W 4/40* (2018.01)

(52) U.S. Cl.
CPC ......... *H04W 74/002* (2013.01); *H04W 24/02* (2013.01); *H04W 4/40* (2018.02)

(58) Field of Classification Search
None
See application file for complete search history.

(56) References Cited

U.S. PATENT DOCUMENTS

| 2016/0295621 | A1* | 10/2016 | Han | H04W 56/001 |
| 2019/0230572 | A1* | 7/2019 | Cheng | H04W 28/24 |

FOREIGN PATENT DOCUMENTS

| CN | 106162930 A | 11/2016 |
| CN | 108307472 A | 7/2018 |
| CN | 108307489 A | 7/2018 |
| CN | 108391285 A | 8/2018 |
| CN | 108923894 A | 11/2018 |
| EP | 3499975 A1 | 6/2019 |
| EP | 3579642 A1 | 12/2019 |
| WO | 2018028694 A1 | 2/2018 |
| WO | 2018141294 A1 | 8/2018 |

OTHER PUBLICATIONS

Office Action of the Indian application No. 202117044116, dated Apr. 27, 2022. 8 pages with English translation.
(Continued)

*Primary Examiner* — Christine T Duong
(74) *Attorney, Agent, or Firm* — Perkins Coie LLP

(57) ABSTRACT

A terminal connection method includes that: a first terminal sends a first message to a second terminal, the first message including a first access layer configuration parameter, and the first access layer configuration parameter being used by the second terminal to configure a parameter of an access layer to communicate with the first terminal.

13 Claims, 13 Drawing Sheets

(56) References Cited

OTHER PUBLICATIONS

OPPO "Discussion on QoS for NR-V2X" 3GPP TSG-RAN WG2 Meeting #105 R2-1900173(Revision of R2-1816342); Athens, Greece, Feb. 25-Mar. 1, 2019; Agenda Item: 11.4.5. 5 pages.
First Office Action of the European application No. 19922175.5, dated Nov. 21, 2022. 5 pages.
Fourth Office Action of the Chinese application No. 202111092681.5, dated Jul. 29, 2023, 8 pages with English translation.
Second Office Action of the Japanese application No. 2021-557110, dated Aug. 22, 2023, 6 pages with English translation.
Second Office Action of the European application No. 19922175.5, dated Apr. 26, 2023. 4 pages.
Third Office Action of the Chinese application No. 202111092681.5, dated May 31, 2023. 6 pages with English translation.
Qualcomm Incorporated, "Discussion on QoS design for NR PC5 communication", 3GPP TSG-RAN WG2 Meeting #104 R2-1817776, Nov. 12-16, 2018, pp. 1-3.
Chinese Application No. 202111092681.5, First Office Action dated Jan. 3, 2023, pp. 1-12.
InterDigital Inc., "Further Details on Link Establishment Procedure", 3GPP TSG RAN WG2 #105 R2-1901580, Feb. 25-Mar. 1, 2019, pp. 1-4.
Japanese Application No. 2021-557110, First Office Action dated Mar. 3, 2023, pp. 1-7.
Chinese Application No. 202111092681.5, Second Office Action dated Mar. 16, 2023, pp. 1-8.
Qualcomm Incorporated, "Discussion on QoS design for NR PC5 communication", 3GPP TSG-RAN WG2 Meeting #105 R2-1901729 (revision of R2-1817776), Athens, Greece, Feb. 25-Mar. 1, 2019. 6 pages.
Supplementary European Search Report in the European application No. 19922175.5, dated Feb. 10, 2022. 8 pages.
Written Opinion of the International Search Authority in the international application No. PCT/CN2019/080229, dated Nov. 28, 2019. 9 pages with English translation.
International Search Report in the international application No. PCT/CN2019/080229, dated Nov. 28, 2019.
ZTE. "Discussion on Connection Establishment and Bearer Setup" 3GPP TSG-RAN WG2 Meeting #96 R2-168149, Nov. 4, 2016 (Nov. 4, 2016),sections 1-3.
Vodafone "New SID:Study on NR V2X"3GPP TSG RAN Meeting #80 RP-181429,La Jolla, USA, Jun. 11-14, 2018.
Notice of Rejection of the Chinese application No. 202111092681.5, dated Oct. 24, 2023, 8 pages with English translation.
First Office Action of the Vietnamese application No. 1-2021-06327, dated Dec. 29, 2023, 3 pages with English translation.

* cited by examiner

TERMINAL CONNECTION METHOD, FIRST TERMINAL AND SECOND TERMINAL

CROSS-REFERENCE TO RELATED APPLICATION

This application is a U.S. continuation application of International Application No. PCT/CN2019/080229, entitled "TERMINAL CONNECTION METHOD AND TERMINAL", filed on Mar. 28, 2019, the disclosure of which is hereby incorporated by reference in its entirety.

TECHNICAL FIELD

The present disclosure relates to the technical field of Internet of Vehicles communications, and particularly, to a method for connecting terminals, a first terminal, and a second terminal.

BACKGROUND

Device-to-device communication is a SideLink (SL) transmission technology based on Device to Device (D2D). Unlike a conventional cellular system in which communication data is received or sent through a base station, an Internet of Vehicles system employs terminal-to-terminal direct communication, and thus has higher spectral efficiency and lower transmission delay.

In the Internet of Vehicles system of Vehicle to Everything (V2X) of the Long Term Evolution (LTE), since the main service is the broadcast service, there is no concept of connection between terminals, much less the management mechanism with respect to the connection between terminals. In the Internet of Vehicles system of V2X of the New Radio (NR), although there is a concept of connection between terminals, there is currently no management mechanism with respect to the connection between terminals, including the management on the connection between terminals at the access layer. Based on this, there is no effective solution to the management on the connection between terminals at the access layer.

SUMMARY

The embodiments of the disclosure provide a method for connecting terminals, a first terminal and a second terminal.

In a first aspect, an embodiment of the present disclosure provides a method for connecting terminals. The method includes that: a first terminal sends a first message to a second terminal. Herein, the first message includes a first access layer configuration parameter, and the first access layer configuration parameter is used by the second terminal to configure a parameter of an access layer to communicate with the first terminal.

In a second aspect, an embodiment of the present disclosure provides a first terminal. The first terminal includes a transceiver configured to send a first message to a second terminal. The first message includes a first access layer configuration parameter, and the first access layer configuration parameter is used by the second terminal to configure a parameter of an access layer, so as to communicate with the first terminal.

In a third aspect, an embodiment of the present disclosure provides a second terminal. The second terminal includes a transceiver and a processor.

Herein, the transceiver is configured to receive a first message from a first terminal, and the first message includes a first access layer configuration parameter.

The processor is to configure a parameter of an access layer based on the first access layer configuration parameter, so as to communicate with the first terminal.

BRIEF DESCRIPTION OF THE DRAWINGS

The drawings illustrated herein serve to provide a further understanding of the present disclosure, and constitute a part of the present disclosure. The illustrative embodiments of the present disclosure and the description thereof serve to explain the present disclosure, and are not intended to unduly limit the present disclosure. In the drawings.

DETAILED DESCRIPTION

The technical solutions of the embodiments of the present disclosure will be described with reference to the accompanying drawings of the embodiments of the present disclosure. It will be apparent that the described embodiments are some, but not all, embodiments of the present disclosure. Based on the embodiments in the present disclosure, all other embodiments obtained by a person of ordinary skill in the art without involving any inventive effort fall within the scope of the present disclosure.

The technical solutions of the embodiments of the present disclosure may be applied to an Internet of Vehicles system. The Internet of Vehicles is a large interactive network composed of information such as a vehicle position, a speed, a route, or the like. By means of a device such as a Global Positioning System (GPS), a Radio Frequency Identification (RFID), a sensor, a camera with picture processing, or the like, the vehicle may acquire its own environment and state information. The Internet technology allows all vehicles to transmit and converge their own various information to the central processing unit. By means of computer technology, the information on large numbers of vehicles may be analyzed and processed so as to calculate the best routes of different vehicles, report the road conditions in time, and arrange the signal lamp period, etc.

The data transmission in the Internet of Vehicles system may be based on a mobile communication network, for example, a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5$^{th}$ Generation Mobile Communication Technology (5G) system.

Figure 1A:
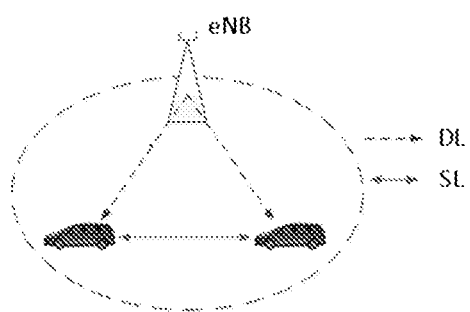
FIGS. 1A and 1B are schematic diagrams of system architecture of an Internet of Vehicles according to an embodiment of the present disclosure, respectively.
Figure 1B:
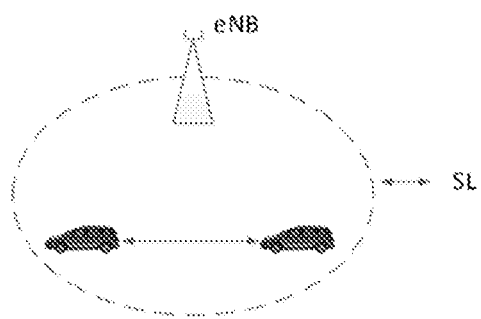

Exemplarily, the Internet of Vehicles system applied to the embodiments of the present disclosure is illustrated in FIGS. 1A and 1B. The Internet of Vehicles system may include a network device and a terminal, and the network device may be a device in communication with the terminal (or referred to as a communication terminal). The network device may provide communication coverage for a particular geographic area and may communicate with terminals located within the coverage area. Optionally, the network device may be a Base Transceiver Station (BTS) in a GSM system or a CDMA system, a NodeB (NB) in a WCDMA system, an Evolutional Node B (eNB or eNodeB) in an LTE system, a radio controller in a Cloud Radio Access Network (CRAN), or the like.

The terminal in the embodiment of the present disclosure is a vehicle-mounted terminal mounted in a vehicle.

Exemplarily, there may be two data transmission modes in the Internet of Vehicles system in the embodiments of the present disclosure, as illustrated in FIGS. 1A and 1B, respectively. Referring to FIG. 1A, transmission resources of a terminal are allocated by a network device (such as an eNB illustrated in FIG. 1A) through a downLink (DL). The terminal performs data transmission on the SideLink (SL) according to the transmission resources allocated by the network device. Referring to FIG. 1B, the terminal adopts a transmission mode of sensing and reservation. The terminal obtains a set of available transmission resources through sensing in the resource pool, selects one transmission resource from the set of transmission resources, and performs data transmission through the SL based on the selected transmission resource.

Optionally, the 5G system or 5G network may be referred to as an NR system or NR network.

FIGS. 1A and 1B illustrate one network device and two terminals. Optionally, the Internet of Vehicles system may include multiple network devices, and other numbers of terminals may be included within the coverage area of each network device, which is not limited in the embodiments of the present disclosure.

Optionally, the Internet of Vehicles system may further include other network entities such as a network controller and a mobility management entity, which are not limited in the embodiments of the present disclosure.

It is to be understood that a device having a communication function in the Internet of Vehicles system in an embodiment of the present disclosure may be referred to as a communication device. Taking the Internet of Vehicles system illustrated in FIGS. 1A and 1B as an example, a communication device may include a network device and a terminal having a communication function, and the network device and the terminal may be specific devices as described above, of which the details are not described herein. The communication device may further include other devices in the Internet of Vehicles system, such as network controllers, mobility management entities, and other network entities, which are not limited in the embodiments of the present disclosure.

It is to be understood that the terms "system" and "network" may be used interchangeably herein. The term "and/or", as used herein, is merely an association that describes associated objects, indicating that there may be three relationships. For example, A and/or B, may indicate that A alone is present, both A and B are present, and B alone is present. In addition, the character "/" generally indicates that the relationship among the associated objects is "or".

The technical solutions of the embodiments of the present disclosure are mainly applied to the 5G mobile communication system. Of course, the technical solutions of the embodiments of the present disclosure are not limited to the 5G mobile communication system, and may be applied to other types of mobile communication systems.

Figure 2:
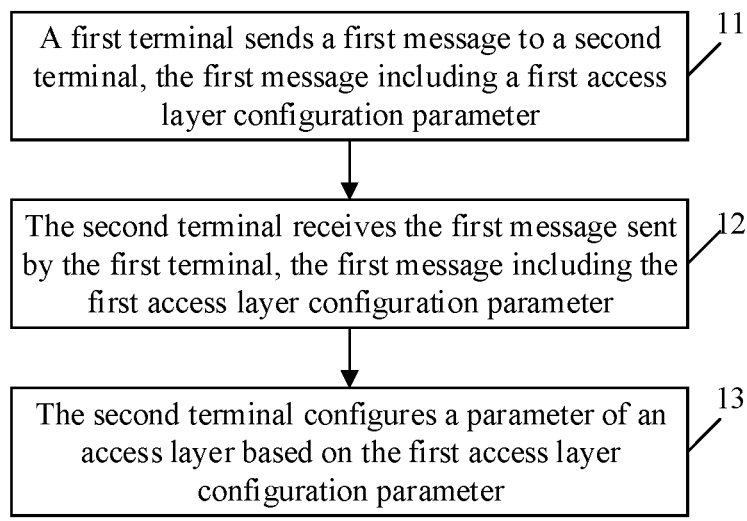
FIG. 2 is a first flowchart of a method for connecting terminals according to an embodiment of the present disclosure.

The embodiment of the disclosure provides a method for connecting terminals. FIG. 2 is a first flowchart of a method for connecting terminals according to an embodiment of the present disclosure. As illustrated in FIG. 2, the method includes the following operations.

In 11, a first terminal sends a first message to a second terminal. Herein, the first message includes a first access layer configuration parameter, and the first access layer configuration parameter is used by the second terminal to configure a parameter of an access layer.

In 12, the second terminal receives the first message sent by the first terminal. Herein, the first message includes the first access layer configuration parameter.

In 13, the second terminal configures the parameter of the access layer based on the first access layer configuration parameter, so as to communicate with the first terminal.

In the embodiment, the first access layer configuration parameter is used by the second terminal to configure at least one of the following access layers: a Service Data Adaptation Protocol (SDAP) layer, a Packet Data Convergence Protocol (PDCP) layer, a Radio Link Control (RLC) layer, a Media Access Control (MAC) layer, or a physical (PHY) layer. After the second terminal configures the parameter of the access layer based on the first access layer configuration parameter, the D2D communication between the first terminal and the second terminal is achieved.

In the embodiment, the first terminal may send the first message to the second terminal under certain conditions. In an optional embodiment of the present disclosure, the operation of sending, by the first terminal, the first message to the second terminal includes that: the first terminal sends the first message to the second terminal when the second terminal is in a specific state. The specific state includes at least one of the following states: the second terminal is outside a network coverage area within which the first terminal is located; the second terminal is in an idle state or an inactive state; or a resource selection mode corresponding to the second terminal is a mode in which the terminal selects a resource autonomously.

In an embodiment, before the first terminal sends the first message to the second terminal, the method further includes: the first terminal receives a fourth message sent by the second terminal. The fourth message indicates that the second terminal is in the specific state.

Optionally, it may be understood that the second terminal receives the first message under certain conditions, and configures the parameter of the access layer according to the first access layer configuration parameters included in the first message.

In other embodiments, the second terminal may further select the first access layer configuration parameter to configure the parameter of the access layer under the specific conditions described above, or configure the parameter of the access layer according to the access layer configuration parameter sent by a network device.

In the embodiment, the first message includes at least one of the following information corresponding to at least one of the first terminal or the second terminal: a PCI5 5G Quality of Service (QoS) Indicator (PQI), a V2X 5G QoS Indicator (VQI), a data rate requirement, a communication range requirement, a QoS Flow Identifier (QFI), a mapping relationship between the PQI and a bearer, a mapping relationship between the VQI and the bearer, a mapping relationship between the QFI and a bearer, a mapping relationship between the data rate requirement and a bearer, or a mapping relationship between the communication range requirement and the bearer. As an example, the above-mentioned information may be included in the first access layer configuration parameter.

In an optional embodiment of the present disclosure, before sending, by the first terminal, the first message to the second terminal, the method further includes: the first terminal sends a first set of QoS attribute information corresponding to at least one of the first terminal or the second terminal to a first network device. The first set of QoS attribute information including at least one of: a PCI5 5G QoS Indicator (PQI), a V2X 5G QoS Indicator (VQI), a data rate requirement, a communication range requirement, a QoS Flow Identifier (QFI), a mapping relationship between a PQI and a bearer, a mapping relationship between a VQI and the bearer, a mapping relationship between a QFI and the bearer, a mapping relationship between a data rate requirement and the bearer, a mapping relationship between a communication range requirement and the bearer, a Provider Service Identifier (PSID), or an Intelligent Transportation Systems Application Identifier (ITS-AID). Herein, the bearer is a bearer used for communication between the first terminal and the second terminal. The embodiment is used for the first terminal to report the QoS attribute information of at least one of the first terminal or the second terminal to the first network device. It may be understood that the first terminal reports QoS attribute information of at least one of the first terminal or the second terminal to the first network device. On the one hand, the first terminal may report capability information of a terminal (including at least one of the first terminal or the second terminal) to the first network device. On the other hand, the first network device may allocate resources according to capability information of a terminal when allocating resources to the terminal. Herein, the first network device may be an access network device connected to the first terminal, such as a base station connected to a first terminal.

In the embodiment of the present disclosure, the bearer is a bearer used for communication between the first terminal and the second terminal. Before the second terminal configures the parameter of the access layer, D2D communication cannot be performed between the first terminal and the second terminal, but a message transmission can be performed between the first terminal and the second terminal, such as transmission of a first message between the first terminal and the second terminal in the present embodiment.

It may be understood that the bearer includes a bearer in the first terminal used for communication with the second terminal and a bearer in the second terminal used for communication with the first terminal. In the present embodiment, all the bearers before the first terminal and the second terminal perform the D2D communication are bearers used for communication between the first terminal and the second terminal.

In the present embodiment, the first terminal sends QoS attribute information corresponding to at least one of the first terminal or the second terminal to the first network device by correspondingly sending different QoS attribute information according to different networks (specifically, the network is a core network) in which the first terminal is located.

In one embodiment, the operation of sending, by the first terminal, the first set of QoS attribute information corresponding to at least one of the first terminal or the second terminal to the first network device includes: the first terminal sends first QoS attribute information in the first set of QoS attribute information to the first network device. Herein, the first QoS attribute information is sent when the first terminal is in a first network. The first network includes a network based on a Evolved Packet Core network (EPC). The first QoS attribute information includes at least one of the following information: a PQI, a VQI, a data rate requirement, a communication range requirement, a mapping relationship between a PQI and a bearer, a mapping relationship between a VQI and a bearer, a mapping relationship between a data rate requirement and a bearer, or a mapping relationship between a communication range requirement and a bearer.

In another embodiment, the operation of sending, by the first terminal, the first set of QoS attribute information corresponding to at least one of the first terminal or the second terminal to the first network device includes: the first terminal sends second QoS attribute information in the first set of QoS attribute information to the first network device. Herein, the second QoS attribute information is sent when the first terminal is in a second network. The second network includes a network based on a 5G core network (5GC). The second QoS attribute information includes at least one of a QFI, or a mapping relationship between the QFI and a bearer.

In an optional embodiment of the present disclosure, before sending, by the first terminal, the first message to the second terminal, the method further includes: the first terminal receives a second access layer configuration parameter corresponding to at least one of the first terminal or the second terminal sent by a first network device. Herein, the second access layer configuration parameter includes a first set of mapping relationships. The first set of mapping relationships include at least one of: a mapping relationship between the PQI and the bearer, a mapping relationship between the VQI and the bearer, a mapping relationship between the data rate requirement and the bearer, a mapping relationship between the communication range requirement and the bearer, or a mapping relationship between the QFI and the bearer. Herein, the bearer is a bearer used for communication between the first terminal and the second terminal.

In the embodiment, the first terminal receives the second access layer configuration parameter corresponding to at least one of the first terminal or the second terminal sent by the first network device by correspondingly receiving different second access layer configuration parameters according to different networks in which the first terminal is located.

In one embodiment, the operation of receiving, by the first terminal, the second access layer configuration parameter sent by the first network device includes: the first terminal receives the second access layer configuration parameter from the first network device, the second access layer configuration parameter including a first mapping relationship, and the second access layer configuration parameter being received when the first terminal is in a first network. Herein, the first network includes a network based on EPC. The first mapping relationship includes at least one of the following information: the mapping relationship between the PQI and the bearer, the mapping relationship between the VQI and the bearer, the mapping relationship between the data rate requirement and the bearer, or the mapping relationship between the communication range requirement and the bearer.

In another embodiment, the operation of receiving, by the first terminal, the second access layer configuration parameter sent by the first network device includes: the first terminal receives the second access layer configuration parameter from the first network device, the second access layer configuration parameter including a second mapping relationship, and the second access layer configuration parameter being received when the first terminal is in a second network. Herein, the second network includes a network based on 5GC. The second mapping relationship includes a mapping relationship between the QFI and the bearer.

In the embodiment, a content of the first access layer configuration parameter is associated with the second access layer configuration parameter. It can be understood that the first terminal first receives the second access layer configuration parameter sent by the first network device, determines the first access layer configuration parameter based on the second access layer configuration parameter, and then sends the first access layer configuration parameter to the second terminal. The first access layer configuration parameter may be completely consistent with the second access layer configuration parameter, or may be partially consistent.

In an embodiment, in the case where the first terminal receives the second access layer configuration parameter sent by the first network device, the second access layer configuration parameter is received when the first terminal is in the first network, and the first network includes a network based on EPC, the method further includes:

the first terminal performs at least one of the following: not configuring a Service Data Adaptation Protocol (SDAP) layer; configuring a SDAP layer, and mapping at least one of the PQI, the VQI, the data rate requirement, or the communication range requirement to the bearer; or configuring the SDAP layer, and mapping the QFI to the bearer according to at least one of a mapping relationship between the PQI and the QFI, a mapping relationship between the VQI and the QFI, a mapping relationship between the data rate requirement and the QFI, or a mapping relationship between the communication range requirement and the QFI, and according to at least one of the mapping relationship between the PQI and the bearer, the mapping relationship between the VQI and the bearer, the mapping relationship between the data rate requirement and the bearer, or the mapping relationship between the communication range requirement and the bearer.

In an optional embodiment of the present disclosure, before sending, by the first terminal, the first message to the second terminal, the method further includes: the first terminal receives a second set of mapping relationships sent by the second terminal. The second set of mapping relationships correspond to the second terminal. The second set of mapping relationships include at least one of the following information: a mapping relationship between a QoS attribute and a QFI, a mapping relationship between a QFI and a bearer, or a mapping relationship between the QoS attribute and the bearer; herein, the bearer is a bearer used for communication between the first terminal and the second terminal. Correspondingly, before receiving, by the second terminal, the first message sent by the first terminal, the method includes: the second terminal sends a second set of mapping relationships to the first terminal. The second set of mapping relationships correspond to the second terminal. The second set of mapping relationships include at least one of the following information: a mapping relationship between a QoS attribute and a QFI, a mapping relationship between the QFI and a bearer, or a mapping relationship between the QoS attribute and the bearer. Herein, the bearer is a bearer used for communication between the first terminal and the second terminal.

It is to be understood that, as an example, a first set of QoS attribute information corresponding to the second terminal sent by the first terminal to the first network device is associated with the second set of mapping relationships, i.e., the first terminal sends the first set of QoS attribute information corresponding to the second terminal to the first network device after receiving the second set of mapping relationships of the second terminal. In the example, when the first terminal does not receive the second set of mapping relationships before the first terminal sends the first set of QoS attribute information to the first network device, the first terminal sends a first set of QoS attribute information corresponding to the first terminal to the first network device; when the first terminal receives the second set of mapping relationships before the first terminal sends the first set of QoS attribute information to the first network device, the first terminal sends the first set of QoS attribute information corresponding to the first terminal to the first network device, or the first terminal sends the first set of QoS attribute information corresponding to the second terminal to the first network device, or the first terminal sends the first set of QoS attribute information corresponding to the first terminal and the second terminal to the first network device.

In an embodiment, the operation of receiving, by the first terminal, the second set of mapping relationships sent by the second terminal includes that: the first terminal receives the second set of mapping relationships from the second terminal through PC5-S signaling (PC5-S). As an example, the PC5-S signaling may be one of a direct communication request or a direct communication acceptance.

In another embodiment, the first terminal receives a second set of mapping relationships from the second terminal through Radio Resource Control (RRC) signaling. As an example, the RRC signaling may be RRC signaling associated with a connection establishment between the first terminal and the second terminal. As another example, the RRC signaling may be RRC signaling associated with a capability transmission between the first terminal and the second terminal.

In an optional embodiment of the present disclosure, after receiving, by the second terminal, the first message sent by the first terminal, the method further includes: the second terminal sends a second set of QoS attribute information associated with the first message to a second network device. The second set of QoS attribute information includes at least one of the following information: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, the mapping relationship between the communication range requirement and the bearer, the PSID, or the ITS-AID. Herein, the bearer is a bearer used for communication between the first terminal and the second terminal.

In the embodiment, the second set of QoS attribute information is associated with a content carried in the first message. As an example, the second set of QoS attribute information may be the same or partially the same as the content contained in the first message.

As an example, the first terminal first receives the second access layer configuration parameter sent by the first network device, determines the first access layer configuration parameter based on the second access layer configuration parameter, and then sends a first message including the first access layer configuration parameter to the second terminal. The second terminal sends the second set of QoS attribute information associated with the first message to the second network device corresponding to the second terminal.

Herein, the second network device may be an access network device to which the second terminal is connected. The second network device is, for example, a base station to which the second terminal is connected. The second network device and the first network device may be the same network device or may be different network devices.

Figure 3:
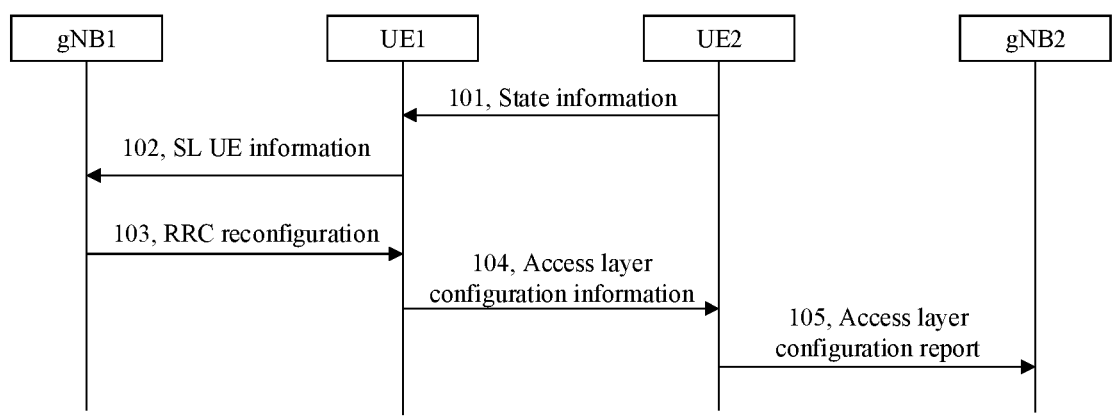
FIG. 3 is a first flowchart of interaction in a method for connecting terminals according to an embodiment of the present disclosure.

Based on the foregoing embodiments, FIG. 3 is a first flowchart of interaction in a method for connecting terminals according to an embodiment of the present disclosure. In the example, a first terminal is a user equipment (UE) 1, a second terminal is UE2, an access network device corresponding to the first terminal is a base station (gNB) 1, and an access network device corresponding to the second terminal is gNB2. As illustrated in FIG. 3, the method includes the following operations.

In 101, UE2 sends state information to UE1.

In 102, UE1 sends sidelink UE information to gNB1.

In 103, gNB1 sends RRC reconfiguration signaling to UE1.

In 104, UE1 sends access layer configuration information, i.e., AS configuration information to UE2.

In 105, UE2 sends an access layer configuration report, i.e., AS configuration report to gNB2.

In the example, UE1 may send a first access layer configuration parameter corresponding to step 11 to UE2 through step 104, and the first access layer configuration parameter is used by UE2 to configure the parameter of the access layer, so as to achieve the D2D communication between UE1 and UE2.

In the example, in step 101, the state information sent by UE2 to UE1 may be at least one of the following in the foregoing embodiments: a second set of mapping relationships; or a specific state that UE2 is in. Herein, the specific state may indicate at least one of the following information: a network coverage state of UE2, an RRC connection state of UE2, or a resource selection mode of UE2. For example, the specific state includes at least one of the following states: UE2 is outside a network coverage area within which UE1 is located; UE2 is in an idle or inactive state; or a resource selection mode corresponding to UE2 is a mode in which a terminal selects a resource autonomously, as illustrated in FIG. 1B.

Herein, the second set of mapping relationships include at least one of: the mapping relationship between the QoS attribute and the QFI, the mapping relationship between the QFI and the bearer, and the mapping relationship between the QoS attribute and the bearer.

In the example, in step 102, the sidelink UE information sent by UE1 to gNB1 may include the first set of QoS attribute information described in the foregoing embodiments. The first set of QoS attribute information includes at least one of the following information: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, the mapping relationship between the communication range requirement and the bearer, the PSID, or the ITS-AID. Herein, the bearer is a bearer used for communication between the first terminal and the second terminal. The contents of the sent QoS attribute information are different for different core networks corresponding to the terminal. In this regard, for a specific difference, references may be made to the description of the foregoing embodiments, of which the details are not described herein again.

In the example, in step 103, the RRC reconfiguration signaling sent by gNB1 to UE1 may include a second access layer configuration parameter described in the foregoing embodiments. The second access layer configuration parameter includes a first set of mapping relationships. The first set of mapping relationships include at least one of the following information: the mapping relationship between the PQI and the bearer, the mapping relationship between the VQI and the bearer, the mapping relationship between the data rate requirements and the bearer, the mapping relationship between the communication range requirement and the bearer, or the mapping relationship between the QFI and the bearer. Herein, the bearer is a bearer used for communication between the first terminal and the second terminal. The contents of the received second access layer configuration parameter are different for different core networks corresponding to the terminal. In this regard, for a specific difference, references may be made to the description of the foregoing embodiments, of which the details are not described herein again.

In the example, prior to step 105, UE2 configures the parameter of the access layer based on the access layer configuration information (specifically, the first access layer configuration parameter or the mapping relationship sent by gNB2) to implement the D2D communication between UE1 and UE2. After the parameter configuration is completed, step 105 is performed.

In an embodiment, in step 105, the access layer configuration report sent by UE2 to gNB2 may include the foregoing second set of QoS attribute information. In other embodiments, after step 104, UE2 may further send the second set of QoS attribute information to gNB2 through a separate message. The second set of QoS attribute information includes at least one of the following information: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, or the mapping relationship between the communication range requirement and the bearer. Herein, the second set of QoS attribute information is associated with the access layer configuration information in step 104.

In the example, after step 105, the method may further include that: UE2 receives a mapping relationship from gNB2. The mapping relationship may include at least one of the following information: the mapping relationship between the PQI and the bearer, the mapping relationship between the VQI and the bearer, the mapping relationship between the data rate requirement and the bearer, the mapping relationship between the communication range requirement and the bearer, and the mapping relationship between the QFI and the bearer. Herein, the bearer is a bearer used for communication between the first terminal and the second terminal. In practical applications, UE2 may select the first access layer configuration parameter based on the circumstances to configure the parameter, or select the mapping relationship configured by gNB2 to configure the parameter.

As may be seen from the above examples, in one embodiment, the flow direction of the data may satisfy gNB1-UE1-UE2-gNB2.

Optionally, in the present embodiment, UE2 configures, only in a specific state, the parameter of the access layer based on the access layer configuration information sent by UE1. For the specific state, references may be made to the foregoing description, of which the details are not repeated herein. Or, UE2 configures, in a specific state, the parameter of the access layer according to the access layer configuration parameter configured by gNB2. Specifically, whether UE2 selects, in a specific state, access layer configuration information sent by UE1 or an access layer configuration parameter sent by gNB2 is determined in a pre-agreed manner or is pre-configured with the configuration information of gNB2.

In the example, when UE1 executes step 104, i.e., when UE1 sends the access layer configuration information to UE2, UE1 sends the access layer configuration information to UE2 based on the state of UE2. As an example, UE1 sends the access layer configuration information to UE2 when UE2 is in a specific state, for which references may be made to the foregoing description and details are not repeated herein.

In the embodiment illustrated in FIG. 3, as an example, a network device (including at least one of gNB1 or gNB2) may allocate resources for UE1 and UE2 based on the obtained information respectively, to perform the following related configurations: a related configuration of a Packet Data Convergence Protocol (PDCP), a related configuration of an RLC, and a related configuration of a Logical Channel (LCH).

According to the technical solutions in the embodiments of the present disclosure, the first terminal sends the first message including the first access layer configuration parameter to the second terminal, such that the second terminal configures the parameter of the access layer based on the first access layer configuration parameter, thereby achieving the D2D communication between the first terminal and the second terminal, and the management on the connection of access layers of the terminals.

Figure 4:
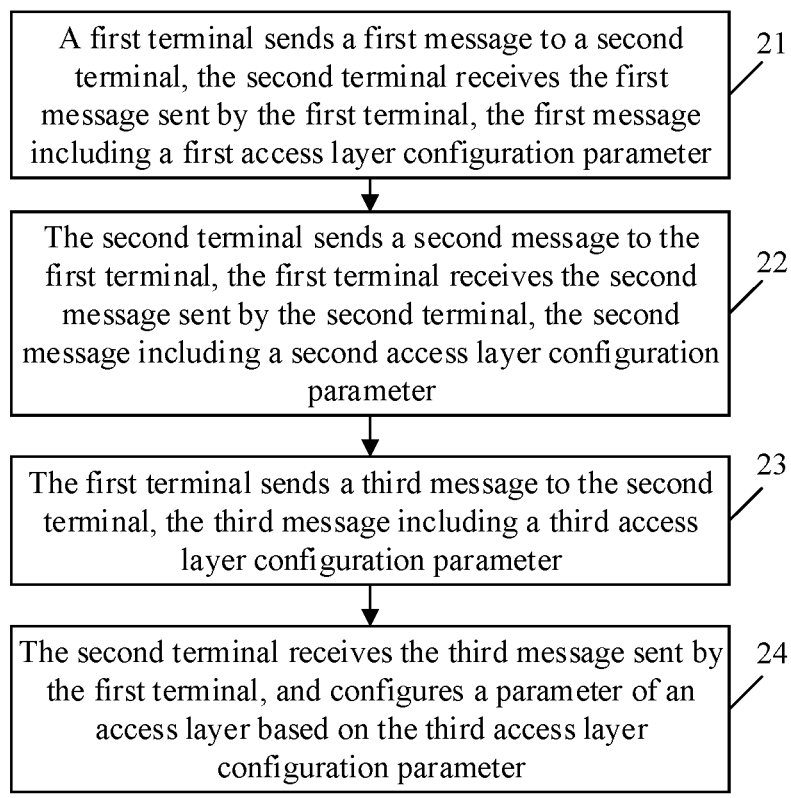
FIG. 4 is a second flowchart of a method for connecting terminals according to an embodiment of the present disclosure.

The embodiment of the disclosure further provides a method for connecting terminals. FIG. 4 is a second flowchart of a method for connecting terminals according to an embodiment of the present disclosure. As illustrated in FIG. 4, the method includes the following operations illustrated in blocks 21 to 24.

In 21, a first terminal sends a first message to a second terminal, and the second terminal receives the first message sent by the first terminal. The first message includes a first access layer configuration parameter which is used by the second terminal to configure a parameter of an access layer.

In 22, the second terminal sends a second message to the first terminal, the first terminal receives the second message sent by the second terminal. The second message includes a second access layer configuration parameter.

In 23, the first terminal sends a third message to the second terminal. The third message includes a third access layer configuration parameter which is used by the second terminal to configure a parameter of an access layer.

In 24, the second terminal receives the third message from the first terminal, and configures a parameter of an access layer based on the third access layer configuration parameter, so as to communicate with the first terminal.

In the present embodiment, for the detailed description of step 21, references may be made to the description associated with step 11 in the foregoing embodiment. For simplicity, the details are not described herein.

In the embodiment, the second access layer configuration parameter may include at least one of the following information corresponding to at least one of the first terminal or the second terminal: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, or the mapping relationship between the communication range requirement and the bearer. The third access layer configuration parameter may include at least one of the following information corresponding to at least one of the first terminal or the second terminal: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, or the mapping relationship between the communication range requirement and the bearer.

In an optional embodiment of the present disclosure, the second terminal sends a second message to the first terminal when at least one of the following conditions is met, i.e., the first terminal receives the second message when at least one of the following conditions is met: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

It is to be understood that in the present embodiment, even if the first terminal sends the first message including the first access layer configuration parameter to the second terminal, the second terminal does not configure, under at least one of the above conditions, the parameter of the access layer according to the first access layer configuration parameter, but sends the second message including the second access layer configuration parameter to the first terminal to re-initiate the parameter configuration of the access layer.

In the embodiment, the second message is used to request modification of the access layer configuration parameter. Based on this, the first terminal sends a third message including the third access layer configuration parameter to the second terminal. The second terminal receives the third message, and configures the parameter of the access layer according to the third access layer configuration parameter, so as to achieve the D2D communication between the first terminal and the second terminal.

Figure 5:
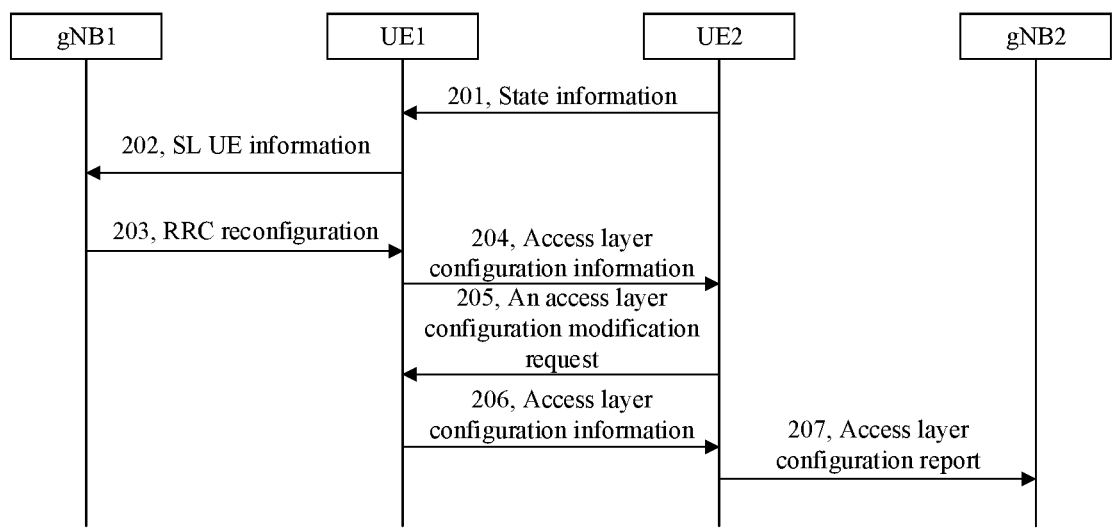
FIG. 5 is a second flowchart of interaction in a method for connecting terminals according to an embodiment of the present disclosure.

Based on the foregoing embodiments, FIG. 5 is a second flowchart of interaction in a method for connecting terminals according to an embodiment of the present disclosure. In the example, a first terminal is user equipment (UE) 1, a second terminal is UE2, an access network device corresponding to the first terminal is a base station (gNB) 1, and an access network device corresponding to the second terminal is a gNB2. As illustrated in FIG. 5, the method includes the following operations illustrated in blocks 201 to 207.

In 201, UE2 sends state information to UE1.

In 202, UE1 sends sidelink terminal information, i.e., Sidelink UE information to gNB1.

In 203, gNB1 sends RRC reconfiguration signaling to UE1.

In 204, UE1 sends access layer configuration information, i.e., AS configuration information to UE2.

In 205, UE2 sends an access layer configuration modification request, i.e., AS configuration modification request to UE1.

In 206, UE1 sends access layer configuration information, i.e., AS configuration information to UE2.

In 207, UE2 sends an access layer configuration report, i.e., AS configuration report to gNB2.

In the example, for the steps other than step 205 and step 206, references may be made to steps 101 to 106 illustrated in FIG. 3, and details are not described herein for simplicity.

In the example, in step 205, the access layer configuration modification request sent by UE2 to UE1 may specifically include the second access layer configuration parameter in the foregoing embodiments. The access layer configuration modification request in the present embodiment is used to trigger the modification of the access layer configuration parameter. It is understood that UE1 in the present embodiment serves as a controller, such that UE2 sends an access layer configuration modification suggestion to UE1; when UE2 agrees to the modification of the access layer configuration parameter, step 205 is not performed; and accordingly, when UE2 does not agree with the modification of the access layer configuration parameter, step 205 is performed, i.e., UE2 sends the access layer configuration modification suggestion to UE1.

In the example, in step 206, the access layer configuration information sent by UE1 to UE2 may specifically include the third access layer configuration parameter in the foregoing embodiments. The third access layer configuration parameter is used by UE2 to configure the parameter of the access layer to achieve the D2D communication between UE1 and UE2.

In the example, step 205 may be performed conditionally. As an example, the condition may be a condition in which the second terminal sends the second message to the first terminal in the foregoing embodiments, such as at least one of the following conditions: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

In the example, prior to step 205 or step 207, the method may further include: UE2 sends a second set of QoS attribute information to gNB2. The second set of QoS attribute information including at least one of the following information: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, or the mapping relationship between the communication range requirement and the bearer. Herein, when the operation of sending, by UE2, the second set of QoS attribute information to gNB2 is performed before step 205, the second set of QoS attribute information is associated with the access layer configuration information in step 204; and when the operation of sending, by UE2, the second set of QoS attribute information to gNB2 is performed before step 207, the second set of QoS attribute information is associated with the access layer configuration information in step 206.

In the example, before step 205 or after step 207, the method may further include: UE2 receives a mapping relationship from gNB2. The mapping relationship may include at least one of the following: the mapping relationship between the PQI and the bearer, the mapping relationship between the VQI and the bearer, the mapping relationship between the data rate requirement and the bearer, the mapping relationship between the communication range requirement and the bearer, or the mapping relationship between the QFI and the bearer. Herein, the bearer is a bearer used for communication between the first terminal and the second terminal. In practical applications, UE2 may select, based on the circumstances, the first access layer configuration parameter to configure the parameter, or select the mapping relationship configured by gNB2 to configure the parameter.

In the example, after step 206, UE2 configures the parameter of the access layer based on the access layer configuration information (specifically, the access layer configuration information in step 206 or the mapping relationship sent by gNB2) to achieve the D2D communication between UE1 and UE2. UE2 may select, based on the circumstances, the first access layer configuration parameter to configure the parameter, or select the mapping relationship configured by gNB2 to configure the parameter.

According to the technical solutions of the embodiments of the present disclosure, on one hand, the first terminal sends the first message including the first access layer configuration parameter to the second terminal, such that the second terminal configures the parameter of the access layer based on the first access layer configuration parameter, thereby achieving the D2D communication between the first terminal and the second terminal; on the other hand, when the related information for terminal connection in the first terminal is different from that in the second terminal, the second terminal sends the second access layer configuration parameter to the first terminal, the first terminal sends the third access layer configuration parameter to the second terminal, and the second terminal configures the parameter of the access layer based on the third access layer configuration parameter, thereby achieving the management on the connection of access layers of the terminals.

Figure 6:
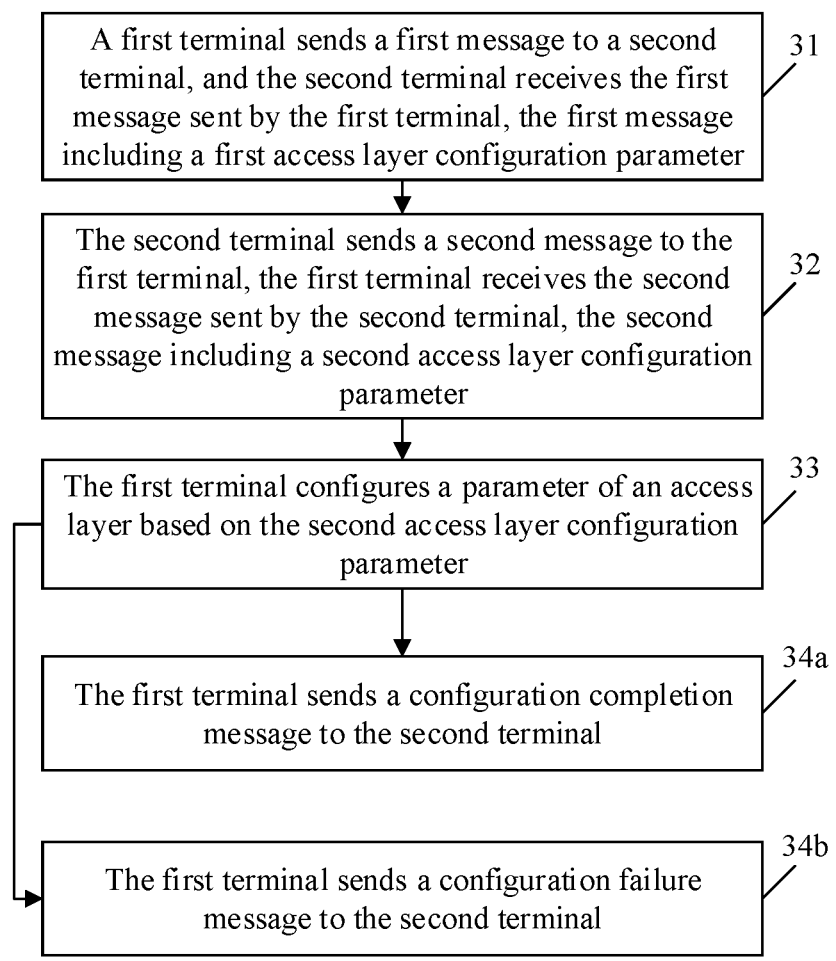
FIG. 6 is a third flowchart of a method for connecting terminals according to an embodiment of the present disclosure.

The embodiment of the disclosure further provides a method for connecting terminals. FIG. 6 is a third flowchart of a method for connecting terminals according to an embodiment of the present disclosure. As illustrated in FIG. 6, the method includes the following operations illustrated in blocks 31 to 34b.

In 31, a first terminal sends a first message to a second terminal, and the second terminal receives the first message from the first terminal. The first message includes a first access layer configuration parameter. The first access layer configuration parameter is used by the second terminal to configure a parameter of an access layer.

In 32, the second terminal sends a second message to the first terminal, the first terminal receives the second message from the second terminal, and the second message includes a second access layer configuration parameter. The second access layer configuration parameter is used by the first terminal to configure a parameter of an access layer.

In 33, the first terminal configures the parameter of the access layer based on the second access layer configuration parameter, so as to communicate with the second terminal.

In 34a, when the first terminal completes the configuration of the parameter of the access layer, the first terminal sends a configuration completion message to the second terminal, and the second terminal receives the configuration completion message from the first terminal.

In 34b, when the first terminal fails to configure the parameter of the access layer, the first terminal sends a configuration failure message to the second terminal, and the second terminal receives the configuration failure message from the first terminal. The first terminal maintains a configuration of the first access layer configuration parameter, or the first terminal interrupts a connection between the first terminal and the second terminal, or the first terminal sends an access layer configuration modification request to the second terminal, or the first terminal configures the parameter based on a default parameter.

In the embodiment, for the detailed description of steps 31 to 32, references may be made to the related description of steps 21 to 22 in the foregoing embodiments. For simplicity, details are not described herein.

In the embodiment, the second access layer configuration parameter sent by the second terminal to the first terminal is used by the first terminal to configure a parameter of an access layer, i.e., the first terminal configures the parameter of the access layer according to the second access layer configuration parameter.

In the present embodiment, the first access layer configuration parameter in the first message may be used to configure a parameter of a bearer of the second terminal, and the bearer is used for sending and/or receiving data. The second access layer configuration parameters in the second message may be used to configure the parameter of a bearer of the first terminal, and the bearer is used for sending and/or receiving data.

In an optional embodiment of the present disclosure, the second terminal sends a second message to the first terminal when at least one of the following conditions is met, i.e., the first terminal receives the second message when at least one of the following conditions is met: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

In the present embodiment, the operation that the first terminal configures the parameter of the access layer based on the second access layer configuration parameter includes two cases, which correspond to step 34a and step 34b respectively. As a first case illustrated in step 34a, when the first terminal completes the configuration of the parameter of the access layer based on the second access layer configuration parameter, the first terminal sends a configuration completion message to the second terminal, so as to achieve the D2D communication between the first terminal and the second terminal. As a second case illustrated in step 34b, when the first terminal fails to configure the parameter of the access layer based on the second access layer configuration parameter, the first terminal sends a configuration failure message to the second terminal, and the first terminal maintains the configuration of the first access layer configuration parameter, or the first terminal interrupts the connection between the first terminal and the second terminal, or the first terminal sends an access layer configuration modification request to the second terminal, or the first terminal configures the parameter based on a default parameter.

Figure 7:
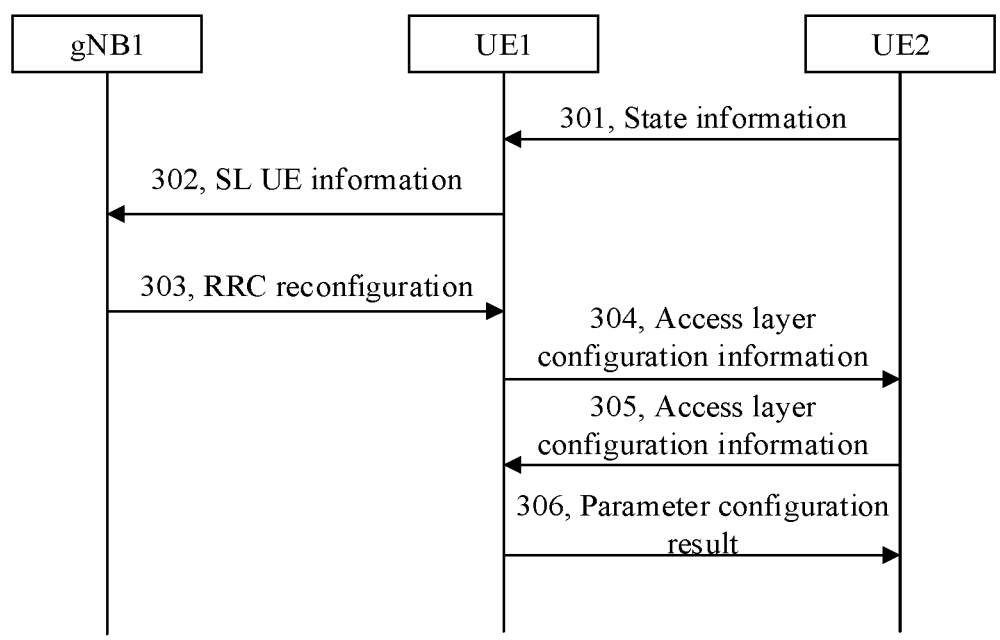
FIG. 7 is a third flowchart of interaction in a method for connecting terminals according to an embodiment of the present disclosure.

Based on the foregoing embodiments, FIG. 7 is a third flowchart of interaction in a method for connecting terminals according to an embodiment of the present disclosure. In the example, a first terminal is user equipment (UE) 1, a second terminal is UE2, an access network device corresponding to the first terminal is a base station (gNB) 1, and an access network device corresponding to the second terminal is a gNB2. As illustrated in FIG. 7, the method includes the following operations illustrated in blocks 301 to 306.

In 301, UE2 sends state information to UE1.

In 302, UE1 sends sidelink terminal information, i.e., Sidelink UE information to gNB1.

In 303, gNB1 sends RRC reconfiguration signaling to UE1.

In 304, UE1 sends access layer configuration information, i.e., AS configuration information to UE2.

In 305, UE2 sends the access layer configuration information, i.e., AS configuration information to UE1.

In 306, UE1 sends a parameter configuration result to UE2.

In the example, for the detailed description of steps 301 to 304, references may be made to the description of steps 101 to 104 illustrated in FIG. 3, and details are not described herein for simplicity.

In the example, in step 305, the access layer configuration information sent by UE2 to UE1 may specifically include the second access layer configuration parameter in the foregoing embodiments. The access layer configuration information in the present embodiment is used to trigger the modification of the access layer configuration parameter. It is understood that UE2 in the present embodiment serves as a controller, such that UE2 sends the access layer configuration information (i.e., the second access layer configuration parameter) to UE1; and UE1 configures the parameter of the access layer according to the second access layer configuration parameter.

In the embodiment, the parameter configuration result of UE1 may include two cases. One case is that the configuration is completed, i.e., the parameter configuration result in step 306 includes a configuration completion message. The other case is that the configuration fails, i.e., the parameter configuration result in step 306 includes a configuration failure message, and UE1 maintains the configuration of the first access layer configuration parameter, or UE1 interrupts the connection between UE1 and UE2, or UE1 sends an access layer configuration modification request to UE2, or UE1 configures the parameter based on the default parameter.

In the example, step 305 may be performed conditionally. As an example, the condition may be a condition in which the second terminal sends a second message to the first terminal in the foregoing embodiments, such as at least one of the following conditions: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

In the example, prior to step 305, the method may further include: UE2 sends a second set of QoS attribute information to gNB2. The second set of QoS attribute information including at least one of the following information: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, or the mapping relationship between the communication range requirement and the bearer. Herein, when the operation that the UE2 sends the second set of QoS attribute information to gNB2 is performed before step 305, the second set of QoS attribute information is associated with the access layer configuration information in step 304.

In the example, prior to step 305, the method may further include: UE2 receives a mapping relationship from gNB2. The mapping relationship may include at least one of the following information: the mapping relationship between the PQI and the bearer, the mapping relationship between the VQI and the bearer, the mapping relationship between the data rate requirement and the bearer, the mapping relationship between the communication range requirement and the bearer, or the mapping relationship between the QFI and the bearer. Herein, the bearer is a bearer used for communication between the first terminal and the second terminal. In practical applications, UE2 may select, based on the circumstances, the first access layer configuration parameter to configure the parameter, or select the mapping relationship configured by gNB2 to configure the parameter.

In the example, optionally, after step 304, UE2 configures the parameter of the access layer based on the access layer configuration information (specifically, the access layer configuration information in step 304 or the mapping relationship sent by gNB1), and sends the parameter configuration result to UE1 after the parameter configuration is completed or after the parameter configuration fails.

In the example, before step 306, UE1 configures the parameter of the access layer based on the access layer configuration information (specifically, the access layer configuration information in step 305 or the mapping relationship sent by gNB1) to achieve the D2D communication between UE1 and UE2. After the parameter configuration is completed, step 306 is performed.

According to the technical solutions of the embodiments of the present disclosure, on one hand, a first terminal sends a first message including a first access layer configuration parameter to a second terminal, such that the second terminal configures the parameter of the access layer based on the first access layer configuration parameter, thereby achieving the D2D communication between the first terminal and the second terminal; on the other hand, when the related information for terminal connection in the first terminal is different from that in the second terminal, the second terminal sends the second access layer configuration parameter to the first terminal, and the first terminal configures the parameter of the access layer based on the second access layer configuration parameter, thereby achieving the management on the connection of access layers of the terminals.

Figure 8:
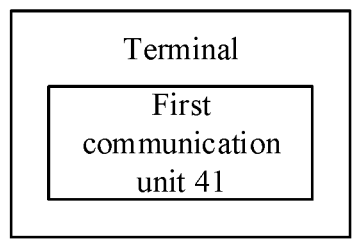
FIG. 8 is a first structure diagram of a terminal according to an embodiment of the present disclosure.

An embodiment of the present disclosure further provides a terminal. The terminal is a first terminal. FIG. 8 is a first structure diagram of a terminal according to an embodiment of the present disclosure. As illustrated in FIG. 8, the terminal includes a first communication unit 41. The first communication unit 41 is configured to send a first message to a second terminal. Herein, the first message includes a first access layer configuration parameter which is used by the second terminal to configure a parameter of an access layer so as to communicate with the first terminal.

In the embodiment, the first access layer configuration parameter is used by the second terminal to configure the parameter of at least one of the following access layers: an SDAP layer, a PDCP layer, an RLC layer, a MAC layer, or a PHY layer.

In an optional embodiment of the present disclosure, the first communication unit 41 is further configured to send a first set of QoS attribute information corresponding to at least one of the first terminal or the second terminal to the network device before sending the first message to the second terminal. The first set of QoS attribute information includes at least one of the following information:

a PQI, a VQI, a data rate requirement, a communication range requirement, a QFI, a mapping relationship between the PQI and a bearer, a mapping relationship between the VQI and the bearer, a mapping relationship between the QFI and the bearer, a mapping relationship between the data rate requirement and the bearer, a mapping relationship between the communication range requirement and the bearer, a PSID, or a ITS-AID. Herein, the bearer is a bearer used for communication between the first terminal and the second terminal.

In the embodiment of the present disclosure, a content of the QoS attribute information sent by the first communication unit 41 to the network device is associated with a network in which the terminal is located.

As an embodiment, the first communication unit 41 is configured to send first QoS attribute information in the first set of QoS attribute information to a network device. Herein, the first QoS attribute information is sent when the terminal is in a first network. The first network includes a network based on EPC. The first QoS attribute information includes at least one of the following information: the PQI, the VQI, the data rate requirement, the communication range requirement, the mapping relationship between the PQI and the bearer, the mapping relationship between the VQI and the bearer, the mapping relationship between the data rate requirement and the bearer, or the mapping relationship between the communication range requirement and the bearer.

As another embodiment, the first communication unit 41 is configured to send second QoS attribute information in the first set of QoS attribute information to the network device. Herein, the second QoS attribute information is sent when the terminal is in a second network. The second network includes a network based on 5GC. The second QoS attribute information includes at least one of the following information: a QFI, or a mapping relationship between the QFI and a bearer.

In an optional embodiment of the present disclosure, the first communication unit 41 is further configured to receive a second access layer configuration parameter corresponding to at least one of the first terminal or the second terminal before sending the first message to the second terminal. Herein, the second access layer configuration parameter includes a first set of mapping relationships. The first set of mapping relationships includes at least one of the following information: the mapping relationship between the PQI and the bearer, the mapping relationship between the VQI and the bearer, the mapping relationship between the data rate requirement and the bearer, the mapping relationship between the communication range requirement and the bearer, and the mapping relationship between the QFI and the bearer. Herein, the bearer is a bearer used for communication between the first terminal and the second terminal.

In the embodiment, the content of the second access layer configuration parameter received by the first communication unit 41 is associated with the network in which the terminal is located.

In one embodiment, the first communication unit 41 is configured to receive a second access layer configuration parameter sent by a network device. The second access layer configuration parameter includes a first mapping relationship, and is received when the terminal is in the first network. The first network includes a network based on EPC. The first mapping relationship includes at least one of the following information: the mapping relationship between the PQI and the bearer, the mapping relationship between the VQI and the bearer, the mapping relationship between the data rate requirement and the bearer, and the mapping relationship between the communication range requirement and the bearer.

As another embodiment, the first communication unit 41 is configured to receive a second access layer configuration parameter sent by a network device. The second access layer configuration parameter includes a second mapping relationship, and is received when the terminal is in the second network. The second network includes a network based on 5GC. The second mapping relationship includes a mapping relationship between the QFI and the bearer.

In another embodiment, the terminal further includes a first processing unit 42 configured to perform at least one of the following: not configuring a Service Data Adaptation Protocol (SDAP) layer; configuring a SDAP layer, and mapping at least one of the PQI, the VQI, the data rate requirement, or the communication range requirement to the bearer; or configuring the SDAP layer, and mapping the QFI to the bearer according to at least one of the mapping relationship between the PQI and the QFI, the mapping relationship between the VQI and the QFI, the mapping relationship between the data rate requirement and the QFI, or the mapping relationship between the communication range requirement and the QFI, and according to at least one of the mapping relationship between the PQI and the bearer, the mapping relationship between the VQI and the bearer, the mapping relationship between the data rate requirement and the bearer, or the mapping relationship between the communication range requirement and the bearer.

The first processing unit 42 performs at least one of the above when the terminal is in a network based on EPC. Further, the first processing unit 42 performs at least one of the above when the terminal is in a network based on EPC and receives the second access layer configuration parameter.

In an optional embodiment of the present disclosure, the first communication unit 41 is further configured to receive the second set of mapping relationships from the second terminal before sending the first message to the second terminal. The second set of mapping relationships correspond to the second terminal. The second set of mapping relationships include at least one of the following information: the mapping relationship between the QoS attribute and the QFI, the mapping relationship between the QFI and the bearer, or the mapping relationship between the QoS attribute and the bearer. Herein, the bearer is a bearer used for communication between the first terminal and the second terminal.

In one embodiment, the first communication unit 41 is configured to receive a second set of mapping relationships from the second terminal through PC5-S signaling.

As another embodiment, the first communication unit 41 is configured to receive a second set of mapping relationships from the second terminal through RRC signaling.

In the embodiment, the first message includes at least one of the following information corresponding to at least one of the first terminal or the second terminal: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, or the mapping relationship between the communication range requirement and the bearer.

In an optional embodiment of the present disclosure, the first communication unit 41 is configured to send the first message to the second terminal when the second terminal is in a specific state. The specific state includes at least one of the following states: the second terminal is outside a network coverage area within which the first terminal is located; the second terminal is in an idle state or an inactive state; or a resource selection mode corresponding to the second terminal is a mode in which the terminal selects a resource autonomously.

In the embodiment, the first communication unit 41 is further configured to receive a fourth message from the second terminal before sending the first message to the second terminal. Herein, the fourth message indicates that the second terminal is in a specific state.

Figure 9:
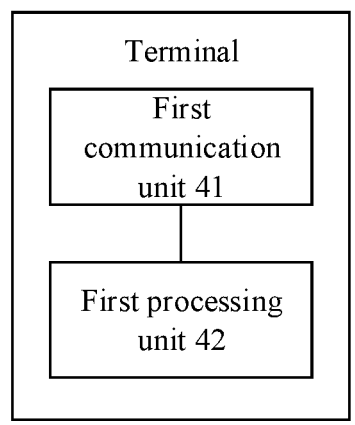
FIG. 9 is a second structure diagram of a terminal according to an embodiment of the present disclosure.

An embodiment of the present disclosure further provides a terminal. The terminal is a first terminal, and the structure of the terminal may be illustrated in FIG. 8 or FIG. 9. The terminal includes a first communication unit 41. The first communication unit 41 is configured to send a first message to a second terminal, and the first message includes a first access layer configuration parameter.

The first communication unit 41 is further configured to receive a second message sent by the second terminal. The second message includes a second access layer configuration parameter.

In an optional embodiment of the present disclosure, the first communication unit 41 is further configured to send a third message to the second terminal. The third message includes a third access layer configuration parameter. The third access layer configuration parameter is used by the second terminal to configure the parameter of the access layer, so as to communicate with the first terminal.

In the embodiment, the first access layer configuration parameter is used by the second terminal to configure the parameter of at least one of the following access layers: an SDAP layer, a PDCP layer, an RLC layer, a MAC layer, or a PHY layer.

Herein, as an example, the first communication unit 41 receives the second message when at least one of the following conditions is met: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

In an optional embodiment of the present disclosure, the first communication unit 41 is configured to send the first message to the second terminal when the second terminal is in a specific state. The specific state includes at least one of the following states: the second terminal is outside a network coverage area within which the first terminal is located; the second terminal is in an idle state or an inactive state; or a resource selection mode corresponding to the second terminal is a mode in which the terminal selects a resource autonomously.

In the embodiment, the first communication unit 41 is further configured to receive a fourth message from the second terminal before sending the first message to the second terminal. Herein, the fourth message indicates that the second terminal is in a specific state.

An embodiment of the present disclosure further provides a terminal. The terminal is a first terminal, and the structure of the terminal may be illustrated in FIG. 8 or FIG. 9. The terminal includes a first communication unit 41. The first communication unit 41 is configured to send a first message to a second terminal, and the first message includes a first access layer configuration parameter.

The first communication unit 41 is further configured to receive a second message sent by the second terminal. The second message includes a second access layer configuration parameter. The second access layer configuration parameter is used by the first terminal to configure the parameter of the access layer, so as to communicate with the second terminal.

In the embodiment, the first terminal configures the parameter of the access layer based on the second access layer configuration parameter sent by the second terminal, so as to achieve the D2D communication between the first terminal and the second terminal.

In the embodiment, the first access layer configuration parameter is used by the second terminal to configure the parameter of at least one of the following access layers: an SDAP layer, a PDCP layer, an RLC layer, a MAC layer, or a PHY layer.

In an optional embodiment of the present disclosure, the first communication unit 41 is further configured to send a configuration completion message to the second terminal.

In an optional embodiment of the present disclosure, the first communication unit 41 is further configured to send a configuration failure message to the second terminal. The first communication unit 41 is further configured to maintain a configuration of the first access layer configuration parameter, or to interrupt a connection between the first terminal and the second terminal, or to send an access layer configuration modification request to the second terminal, or to configure the parameter of the access layer based on a default parameter.

Herein, as an example, the first communication unit 41 receives the second message when at least one of the following conditions is met: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

In an optional embodiment of the present disclosure, the first communication unit 41 is configured to send the first message to the second terminal when the second terminal is in a specific state. The specific state includes at least one of the following states: the second terminal is outside a network coverage area within which the first terminal is located; the second terminal is in an idle state or an inactive state; or a resource selection mode corresponding to the second terminal is a mode in which the terminal selects a resource autonomously.

In the embodiment, the first communication unit 41 is further configured to receive a fourth message from the second terminal before sending the first message to the second terminal. Herein, the fourth message indicates that the second terminal is in a specific state.

In the embodiment of the present disclosure, the first processing unit 42 in the terminal may be implemented by a Central Processing Unit (CPU), a Digital Signal Processor (DSP), a Microcontroller Unit (MCU), or a Field-Programmable Gate Array (FPGA) in the terminal. The first communication unit 41 in the terminal may be implemented by a communication module (including a basic communication kit, an operating system, a communication module, a standardized interface, a protocol, or the like) and a transceiver antenna in a practical application.

It is to be noted that the terminals provided in the abovementioned embodiments are described by way of example only with respect to the partitioning of the program modules when the terminals are connected. In practical applications, the processing may be allocated to different program modules, i.e., the internal structure of the terminal is partitioned into different program modules to perform all or part of the processing described above. In addition, the terminals provided in the above embodiments and the embodiments of the methods for connecting terminals belong to the same concept. For the specific implementation thereof, references may be made to the method embodiments, and the details are not described herein.

Figure 10:
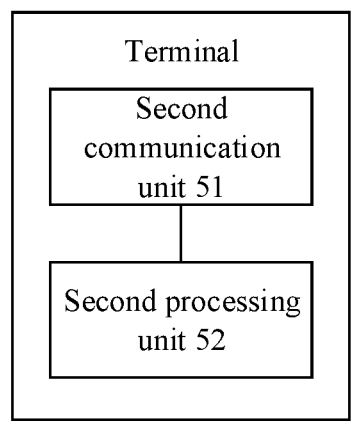
FIG. 10 is a third structure diagram of a terminal according to an embodiment of the present disclosure.

An embodiment of the present disclosure further provides a terminal. Herein, the terminal is a second terminal. FIG. 10 is a third structure diagram of a terminal according to an embodiment of the present disclosure. As illustrated in FIG. 10, the terminal includes a second communication unit 51 and a second processing unit 52.

The second communication unit 51 is configured to receive a first message sent by a first terminal. The first message includes a first access layer configuration parameter.

The second processing unit 52 is configured to configure a parameter of an access layer based on the first access layer configuration parameter, so as to communicate with the first terminal.

In the embodiment, the first access layer configuration parameter is used by the second terminal to configure the parameter of at least one of the following access layers: an SDAP layer, a PDCP layer, an RLC layer, a MAC layer, or a PHY layer.

In the embodiment, the first message includes at least one of the following information corresponding to at least one of the first terminal or the second terminal: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, or the mapping relationship between the communication range requirement and the bearer.

In an optional embodiment of the present disclosure, the second communication unit 51 is configured to send a second set of mapping relationships to the first terminal before receiving the first message sent by the first terminal. The second set of mapping relationships correspond to the second terminal. The second set of mapping relationships include at least one of the following information: the mapping relationship between the QoS attribute and the QFI, the mapping relationship between the QFI and the bearer, or the mapping relationship between the QoS attribute and the bearer. Herein, the bearer is a bearer used for communication between the first terminal and the second terminal.

In one embodiment, the second communication unit 51 is configured to send the second set of mapping relationships to the first terminal through PC5-S signaling.

As another embodiment, the second communication unit 51 is configured to send the second set of mapping relationships to the first terminal through RRC signaling.

In an optional embodiment of the present disclosure, the second communication unit 51 is configured to receive, in a specific state, a first message sent by the first terminal. The specific state includes at least one of the following states: the second terminal is outside a network coverage area within which the first terminal is located; the second terminal is in an idle state or an inactive state; or a resource selection mode corresponding to the second terminal is a mode in which the terminal selects a resource autonomously.

Optionally, the second communication unit 51 is further configured to send a fourth message to the first terminal before receiving the first message sent by the first terminal. The fourth message indicates that the second terminal is in a specific state.

In an optional embodiment of the present disclosure, the second communication unit 51 is further configured to send a second set of QoS attribute information associated with the first message to a second network device. The second set of QoS attribute information includes at least one of the following information: the PQI, the VQI, the data rate requirement, the communication range requirement, the QFI, the mapping relationship between the PQI and the bearer, the mapping relationship between the VQI and the bearer, the mapping relationship between the QFI and the bearer, the mapping relationship between the data rate requirement and the bearer, the mapping relationship between the communication range requirement and the bearer, the PSID, or the ITS-AID. Herein, the bearer is a bearer used for communication between the first terminal and the second terminal.

An embodiment of the present disclosure further provides a terminal. Herein, the terminal is a second terminal, and the structure of the second terminal may be illustrated in FIG. 10. The terminal includes a second communication unit 51 and a second processing unit 52.

The second communication unit 51 is configured to receive a first message sent by a first terminal. The first message includes a first access layer configuration parameter.

The second processing unit 52 is configured to configure a parameter of an access layer based on the first access layer configuration parameter, so as to communicate with the first terminal.

The second communication unit 51 is configured to send a second message to the first terminal. The second message includes a second access layer configuration parameter.

In an optional embodiment of the present disclosure, the second communication unit 51 is further configured to receive a third message sent by the first terminal. The third message includes a third access layer configuration parameter. The third access layer configuration parameter is used by the second terminal to configure the parameter of the access layer, so as to communicate with the first terminal.

In the embodiment, the first access layer configuration parameter is used by the second terminal to configure a parameter of at least one of the following access layers: an SDAP layer, a PDCP layer, an RLC layer, a MAC layer, or a PHY layer.

In the embodiment, optionally, the second communication unit 51 sends a second message to the first terminal when at least one of the following conditions is met: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

In an optional embodiment of the present disclosure, the second communication unit 51 is configured to receive, in a specific state, a first message sent by the first terminal. The specific state includes at least one of the following states: the second terminal is outside a network coverage area within which the first terminal is located; the second terminal is in an idle state or an inactive state; or a resource selection mode corresponding to the second terminal is a mode in which the terminal selects a resource autonomously.

Optionally, the second communication unit 51 is further configured to send a fourth message to the first terminal before receiving the first message sent by the first terminal. The fourth message indicates that the second terminal is in a specific state.

An embodiment of the present disclosure further provides a terminal. The terminal is a second terminal, and the structure of the second terminal may be illustrated in FIG. 10. The terminal includes a second communication unit 51 and a second processing unit 52.

The second communication unit 51 is configured to receive a first message sent by a first terminal. The first message includes a first access layer configuration parameter.

The second processing unit 52 is configured to configure a parameter of an access layer based on the first access layer configuration parameter, so as to communicate with the first terminal.

The second communication unit 51 is configured to send a second message to the first terminal. The second message includes a second access layer configuration parameter. The second access layer configuration parameter is used by the first terminal to configure the parameter of the access layer, so as to communicate with the second terminal.

In an optional embodiment of the present disclosure, the second communication unit 51 is further configured to receive a configuration completion message sent by the first terminal.

In an optional embodiment of the present disclosure, the second communication unit 51 is further configured to receive a configuration failure message sent by the first terminal.

In the embodiment, the first access layer configuration parameter is used by the second terminal to configure the parameter of at least one of the following access layers: an SDAP layer, a PDCP layer, an RLC layer, a MAC layer, or a PHY layer.

In the embodiment, optionally, the second communication unit 51 sends a second message to the first terminal when at least one of the following conditions is met: an Internet Protocol (IP) address used by at least one of the first terminal or the second terminal is different from an IP address of an existing connection; an application layer ID used by at least one of the first terminal or the second terminal is different from an application layer ID of an existing connection; a PSID used by at least one of the first terminal or the second terminal is different from a PSID of an existing connection; a PQI/VQI used by at least one of the first terminal or the second terminal is different from a PQI/VQI of an existing connection; a bearer used by at least one of the first terminal or the second terminal is different from a bearer of an existing connection; or a bearer used by at least one of the first terminal or the second terminal is the same as a bearer used by an existing connection, but a configured destination terminal is different.

In an optional embodiment of the present disclosure, the second communication unit 51 is configured to receive, in a specific state, a first message sent by the first terminal. The specific state includes at least one of one of the following states: the second terminal is outside a network coverage area within which the first terminal is located; the second terminal is in an idle state or an inactive state; or a resource selection mode corresponding to the second terminal is a mode in which the terminal selects a resource autonomously.

Optionally, the second communication unit 51 is further configured to send a fourth message to the first terminal before receiving the first message sent by the first terminal. The fourth message indicates that the second terminal is in a specific state.

In the embodiment of the present disclosure, the second processing unit 52 in the terminal may be implemented by a CPU, a DSP, an MCU or an FPGA in the terminal. The second communication unit 51 in the terminal may be implemented by a communication module (including a basic communication kit, an operating system, a communication module, a standardized interface, a protocol, or the like) and a transceiver antenna in practical applications.

It is to be noted that the terminals provided in the abovementioned embodiments are described by way of example only with respect to the partitioning of the program modules when the terminals are connected. In practical applications, the processing may be allocated to different program modules, i.e., the internal structure of the terminal is partitioned into different program modules to perform all or part of the processing described above. In addition, the terminals provided in the above embodiments and the embodiments of the methods for connecting terminals belong to the same concept. For the specific implementation thereof, references may be made to the method embodiments, and the details are not described herein.

Figure 11:
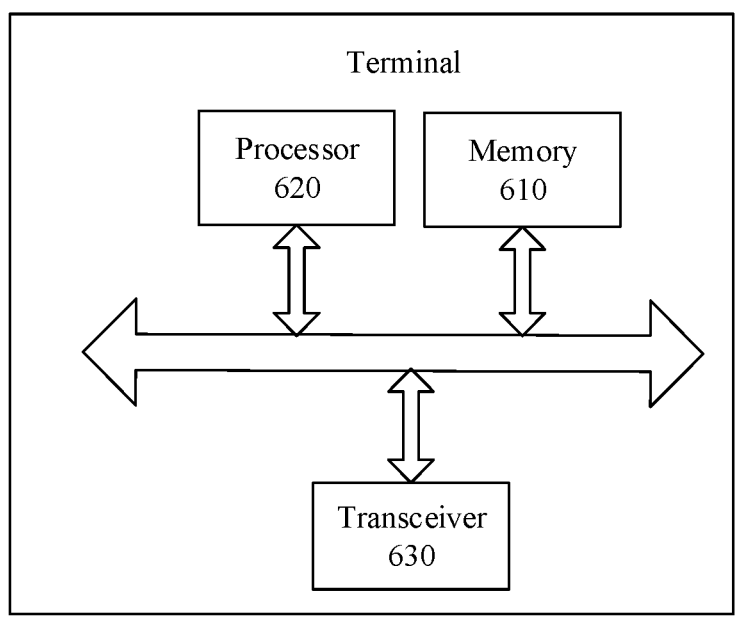
FIG. 11 is a schematic structure diagram of a terminal according to an embodiment of the present disclosure.

FIG. 11 is a schematic structure diagram of a terminal according to an embodiment of the present disclosure. As illustrated in FIG. 11, the terminal includes a processor 610. The processor 610 may call and execute computer programs from a memory, so as to perform the methods in the embodiments of the present disclosure.

Optionally, as illustrated in FIG. 11, the terminal may further include a memory 620. Herein, the processor 610 may call and execute computer programs from the memory 620, so as to perform the methods applied to the first terminal or the second terminal in the embodiments of the present disclosure.

The memory 620 may be a separate device independent of the processor 610, or may be integrated in the processor 610.

Optionally, as illustrated in FIG. 11, the terminal may further include a transceiver 630, and the processor 610 may control the transceiver 630 to communicate with other devices. Specifically, the processor 610 may control the transceiver 630 to send information or data to other devices, or receive information or data sent by other devices.

The transceiver 630 may include a transmitter and a receiver. The transceiver 630 may further include an antenna, and the number of antennas may be one or more.

Figure 12:
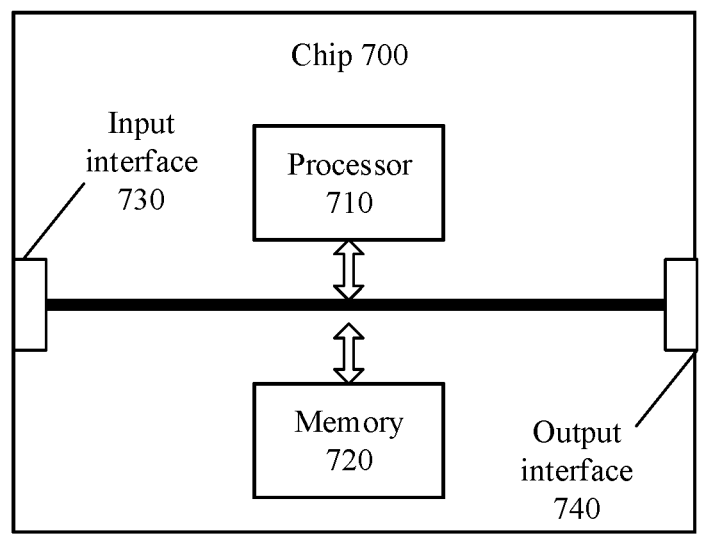
FIG. 12 is a schematic structure diagram of a chip according to an embodiment of the present disclosure.

FIG. 12 is a schematic structure diagram of a chip according to an embodiment of the present disclosure. The chip 700 illustrated in FIG. 12 includes a processor 710. The processor 710 may call and execute computer programs from a memory, so as to perform the methods applied to the first terminal or the second terminal in the embodiments of the present disclosure.

Optionally, as illustrated in FIG. 12, the chip 700 may further include a memory 720. Herein, the processor 710 may call and execute computer programs from the memory 720, so as to perform the methods in the embodiments of the present disclosure.

The memory 720 may be a separate device independent of the processor 710, or may be integrated in the processor 710.

Optionally, the chip 700 may further include an input interface 730. The processor 710 may control the input interface 730 to communicate with other devices or chips. Specifically, the processor 710 may control the input interface 730 to acquire information or data sent by other devices or chips.

Optionally, the chip 700 may further include an output interface 740. The processor 710 may control the output interface 740 to communicate with other devices or chips. Specifically, the processor 710 may control the output interface 740 to output information or data to other devices or chips.

It is to be understood that the chips mentioned in the embodiments of the present disclosure may also be referred to as a system-level chip, a system chip, a chip system or a system-on-chip.

It is to be understood that the processor of the embodiments of the present disclosure may be an integrated circuit chip having signal processing capabilities. In implementation, the steps of the above-described method embodiments may be accomplished by integrated logic circuits of hardware in the processor or instructions in the form of software. The processors described above may be a general purpose processor, a Digital Signal Processor (DSP), an Application Specific Integrated Circuit (ASIC), an Field Programmable Gate Array (FPGA) or other programmable logic devices, a discrete gate, a transistor logic device, or a discrete hardware component. The methods, steps, and logical block diagrams disclosed in the embodiments of the present disclosure may be implemented or performed. The general purpose processor may be a microprocessor or the processor may be any conventional processor or the like. The steps of methods disclosed in connection with the embodiments of the present disclosure may be directly performed by a hardware decoding processor, or performed by a combination of hardware and software modules in the decoding processor. The software module may be located in a mature storage medium in the art such as a random access memory, a flash memory, a read-only memory, a programmable read-only memory, or an electrically erasable programmable memory, a register, or the like. The storage medium is located in a memory, and the processor reads information in the memory and performs the steps of the abovementioned methods in conjunction with the hardware thereof.

It is to be understood that the memory in the embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM), or flash memory. The volatile memory may be Random Access Memory (RAM), which functions as an external cache. Exemplarily but not restrictively, many forms of RAM may be usable, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory of the systems and methods described herein are intended to include, but are not limited to, such and any other suitable types of memories.

It is to be understood that the abovementioned memory is exemplary, but not restrictive, and that the memory in the embodiments of the present disclosure may further be static RAM (SRAM), dynamic RAM (DRAM), synchronous DRAM (SDRAM), double data rate SDRAM (double data rate SDRAM, DDR SDRAM), enhanced SDRAM (ESDRAM), synch link DRAM (SLDRAM), Direct Rambus RAM (DR RAM), or the like. That is, the memory in the embodiments of the present disclosure is intended to include, but is not limited to, such and any other suitable types of memory.

The embodiment of the present disclosure further provides a computer readable storage medium. The storage medium is configured to store a computer program which causes a computer to execute corresponding flows of the methods applied to a first terminal or a second terminal in the embodiments of the present disclosure. For simplicity, details are not described herein.

An embodiment of the present disclosure further provides a computer program product. The computer program product include one or more computer program instructions which cause a computer to execute corresponding flows of the methods applied to a first terminal or a second terminal in the embodiments of the present disclosure. For simplicity, details are not described herein.

An embodiment of the present disclosure further provides a computer program which causes a computer to execute corresponding flows of the methods applied to a first terminal or a second terminal according to the embodiments of the present disclosure. For brevity, details are not described herein.

Those of ordinary skill in the art will recognize that the elements and algorithm steps of the examples described in connection with the embodiments disclosed herein may be implemented in electronic hardware, or a combination of computer software and electronic hardware. Whether these functions are performed in hardware or software depends on the particular application and design constraints of the technical solution. A professional person may use different methods to implement the described functions for each particular application, but such implementation should not be considered to be outside the scope of the present disclosure.

It is apparent to those skilled in the art that for convenience and brevity of description, references may be made to the corresponding processes in the foregoing method embodiments with respect to the specific working procedures of the above-described systems, devices and units, and details are not described herein.

In the embodiments provided herein, it is to be understood that the disclosed devices and methods may be implemented in other ways. For example, the device embodiments described above are merely illustrative. For example, the partitioning of the units is only logical function partitioning, and may be implemented in another partitioning manner. For example, multiple units or components may be combined or integrated into another system, or some features may be omitted or not performed. On the other hand, the coupling, direct coupling or communication connection to each other illustrated or discussed above may be through some interfaces, and the indirect coupling or communication connection between the devices or units may be electrical, mechanical or in other forms.

The elements illustrated as separate elements may or may not be physically separate, and the elements illustrated as elements may or may not be physical elements, may be located at one location, or may be distributed across multiple network elements. Some or all of the elements may be selected according to actual needs to achieve the objectives of the embodiments.

In addition, the functional units in the embodiments of the present disclosure may be integrated in one processing unit, or the units may be separate physical units, or two or more units may be integrated in one unit.

The functions, when implemented as software functional units and sold or used as separate products, may be stored in a computer-readable storage medium. Based on such an understanding, the essentials, or parts which contribute to the art, or a part of the technical solution of the present disclosure may be embodied in the form of a software product. The computer software product is stored in a storage medium and includes instructions to cause a computer device (which may be a personal computer, a server, a network device, or the like) to perform all or some of the steps of the methods described in the embodiments of the present disclosure. The storage medium includes a medium which may store program codes, such as a USB flash drive, a removable hard disk, a ROM, a RAM, a magnetic disk, or an optical disk.

The foregoing description is merely illustrative of the specific embodiments of the present disclosure, but the scope of protection of the present disclosure is not limited thereto. Variations or substitutions may readily occur to those skilled in the art within the technical scope disclosed in the present disclosure, and are intended to be included within the scope of protection of the present disclosure. Accordingly, the scope of protection of the present disclosure should be consistent with the scope of protection of the claims.

The invention claimed is:

1. A method for connecting terminals, comprising:
sending, by a first terminal, a first message to a second terminal, wherein the first message comprises a first access layer configuration parameter, the first access layer configuration parameter being used by the second terminal to configure a parameter of an access layer to communicate with the first terminal,
wherein the method further comprises: before sending, by the first terminal, the first message to the second terminal,
receiving, by the first terminal, a second access layer configuration parameter corresponding to at least one of the first terminal or the second terminal from a first network device, wherein the second access layer configuration parameter comprises a first set of mapping relationships, the first set of mapping relationships comprising a mapping relationship between a Quality of Service (QoS) Flow Identifier (QFI) and a bearer, and the bearer being used for communication between the first terminal and the second terminal.

2. The method of claim 1, further comprising: before sending, by the first terminal, the first message to the second terminal,
sending, by the first terminal, a first set of QoS attribute information corresponding to at least one of the first terminal or the second terminal to a first network device,
wherein the first set of QoS attribute information includes at least one of:
a PC5 5$^{th}$ Generation Mobile Communication Technology (5G) QoS Indicator (PQI), a data rate requirement, a communication range requirement, or the QFI.

3. The method of claim 1, wherein the second access layer configuration parameter is transmitted through Radio Resource Control (RRC) reconfiguration signaling.

4. The method of claim 1, wherein the first access layer configuration parameter is used by the second terminal to configure a parameter of at least one of following access layers: an SDAP layer, a Packet Data Convergence Protocol (PDCP) layer, a Radio Link Control (RLC) layer, a Media Access Control (MAC) layer, or a physical (PHY) layer.

5. A first terminal, comprising:
a transceiver, configured to send a first message to a second terminal, wherein the first message comprises a first access layer configuration parameter, the first access layer configuration parameter being used by the second terminal to configure a parameter of an access layer to communicate with the first terminal,
wherein the transceiver is further configured to receive a second access layer configuration parameter corresponding to at least one of the first terminal or the second terminal from the first network device before sending the first message to the second terminal, and
wherein the second access layer configuration parameter comprises a mapping relationship between a Quality of Service (QoS) Flow Identifier (QFI) and a bearer, the bearer being used for communication between the first terminal and the second terminal.

6. The first terminal of claim 5, wherein the transceiver is further configured to send a first set of QoS attribute information corresponding to at least one of the first terminal or the second terminal to a first network device before sending the first message to the second terminal, and the first set of QoS attribute information comprises at least one of the following:
a PC5 5$^{th}$ Generation Mobile Communication Technology (5G) QoS Indicator (PQI), a data rate requirement, a communication range requirement, or the QFI.

7. The first terminal of claim 5, wherein the second access layer configuration parameter is transmitted through Radio Resource Control (RRC) reconfiguration signaling.

8. The first terminal of claim 5, wherein the first access layer configuration parameter is used by the second terminal to configure a parameter of at least one of the following access layers: an SDAP layer, a Packet Data Convergence Protocol (PDCP) layer, a Radio Link Control (RLC) layer, a Media Access Control (MAC) layer, or a physical (PHY) layer.

9. A second terminal, comprising:
a transceiver, configured to receive a first message from a first terminal, wherein the first message comprises a first access layer configuration parameter; and
a processor, which is to configure a parameter of an access layer based on the first access layer configuration parameter to communicate with the first terminal,
wherein the transceiver is configured to send a second set of mapping relationships to the first terminal before receiving the first message from the first terminal, and
wherein the second set of mapping relationships correspond to the second terminal; the second set of mapping relationships comprise a mapping relationship between a Quality of Service (QoS) Flow Identifier (QFI) and a bearer, the bearer being used for communication between the first terminal and the second terminal.

10. The second terminal of claim 9, wherein the first message comprises at least one of the following information corresponding to at least one of the first terminal or the second terminal:

a PC5 5$^{th}$ Generation Mobile Communication Technology (5G) QoS Indicator (PQI), a data rate requirement, a communication range requirement, or the QFI.

11. The second terminal of any one of claim 9, wherein the transceiver is configured to send a second message to the first terminal, the second message comprising a second access layer configuration parameter.

12. The second terminal of claim 11, wherein the second access layer configuration parameter is transmitted through Radio Resource Control (RRC) reconfiguration signaling.

13. The second terminal of claim 11, wherein the transceiver sends the second message to the first terminal when at least one of the following conditions is met:
- a bearer used by at least one of the first terminal or the second terminal is different from a bearer of the existing connection; or
- the bearer used by at least one of the first terminal or the second terminal is the same as the bearer used by the existing connection, but a configured destination terminal is different.

* * * * *